(12) United States Patent
Vajravel

(10) Patent No.: US 10,747,707 B1
(45) Date of Patent: Aug. 18, 2020

(54) REDIRECTION OF USB DEVICES IN NESTED HUB ENVIRONMENTS

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/673,686

(22) Filed: Nov. 4, 2019

(51) Int. Cl.
*G06F 13/42* (2006.01)
(52) U.S. Cl.
CPC .. *G06F 13/4282* (2013.01); *G06F 2213/0042* (2013.01)
(58) Field of Classification Search
None
See application file for complete search history.

(56) References Cited

U.S. PATENT DOCUMENTS 9,544,179 B2 * 1/2017 Venkatesh ............... G06F 13/00
2020/0050781 A1 * 2/2020 Vajravel ............... G06F 13/4282

\* cited by examiner

*Primary Examiner* — Farley Abad
*Assistant Examiner* — Dayton Lewis-Taylor
(74) *Attorney, Agent, or Firm* — Kirton McConkie; Brian Tucker

(57) ABSTRACT

Redirection of USB devices in nested hub environments can be supported. A redirection driver can detect when a USB device has been connected to the internal USB hub of a client terminal. Based on the type of the USB device, the redirection driver can selectively attach a filter device object to a physical device object for the USB device. Additionally, when a functional device object is loaded, the redirection driver can selectively attach a filter device object to the functional device object based on whether the functional device object represents a USB device that is registered as a USB hub. This selective loading of filter device objects ensures that a USB device connected to an external USB hub can be redirected while also maintaining the ability to redirect simple USB devices and USB composite devices with and without interface level redirection.

20 Claims, 9 Drawing Sheets

US 10,747,707 B1

REDIRECTION OF USB DEVICES IN NESTED HUB ENVIRONMENTS

CROSS-REFERENCE TO RELATED APPLICATIONS

N/A

BACKGROUND

The present invention is generally directed to techniques for redirecting USB devices in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

FIG. 3 provides more detail regarding how client 102 can be configured to redirect a USB device. In particular, FIG. 3 represents various device stacks that can be built on client 102 to enable redirection. The following discussion will use examples based on a Window's implementation, but the present invention should not be limited to instances where client 120 is running a version of Windows. As shown, bus driver 230 includes (or is associated with) a functional device object—USB hub functional device object 230a. As is known, a functional device object or FDO serves as a logical interface to a device (which in this case would be the internal USB hub device). To enable redirection, a redirection driver can be installed on client 102. The redirection driver includes a filter device object (or FiDO) 350a that can be loaded above (or attached to) USB hub FDO 230a to thereby allow filter device object 350a to inspect I/O requests (e.g., I/O request packets or "IRPs") that target USB hub FDO 230a. When a USB device is connected to a USB hub, USB hub FDO 230a (or bus driver 230) will report the presence of the device to the plug-and-play manager (e.g., by calling IoInvalidateDeviceRelations). In response, the plug-and-play manager will request information about devices that are connected to the USB hub such as by sending an IRP_MN_QUERY_DEVICE_RELATIONS request with a relation type of BusRelations to USB hub FDO 230a.

Filter device object 350a can be configured to monitor for IRP_MN_QUERY_DEVICE_RELATIONS requests that are sent to USB hub FDO 230a and can register a completion routine so that filter device object 350a can handle the request once it is completed by USB hub FDO 230a. This will enable filter device object 350a to inspect and modify the information that USB hub FDO 230a reports in response to an IRP_MN_QUERY_DEVICE_RELATIONS request.

As part of handling an IRP_MN_QUERY_DEVICE_RELATIONS request, USB hub FDO 230a can create a physical device object (PDO) (e.g., by calling IoCreateDevice) for any device that is newly connected to the USB hub. For example, in FIG. 3 it is assumed that two USB devices were connected and therefore USB hub FDO 230a has created USB device PDO 311 and USB device PDO 321. USB hub FDO 230a can then create a DEVICE_RELATIONS structure that identifies each connected device (e.g., by including a pointer to each PDO in the structure) and complete the IRP_MN_QUERY_DEVICE_RELATIONS request. Because filter device object 350a has registered a completion routine, it will be given the opportunity to inspect the DEVICE_RELATIONS structure before it is passed to the plug-and-play manager.

Filter device object 350a can be configured to identify a PDO in the DEVICE_RELATIONS structure for any newly connected USB device and can attach a filter instance, filter device object (or PFiDO) 350b, to any such PDO as is represented in FIG. 3. As the plug-and-play process proceeds, the plug-and-play manager will send a request to USB hub FDO 230a for the hardware identifier of each new PDO (e.g., in the form of an IRP_MN_QUERY_ID request). The plug-and-play manager employs the response to this request to identify and load the appropriate FDO for each newly created PDO. Filter device object 350b can be configured to monitor for IRP_MN_QUERY_ID requests and to register a completion routine when one is detected. This enables filter device object 350b to modify the hardware identifier to cause stub driver 220 rather than the actual FDO to be loaded for a particular USB device. For example, filter device object 350b can employ a policy or other settings to determine whether the device represented by the PDO should be redirected. If so, filter device object 350b can replace the hardware identifier reported in response to the IRP_MN_QUERY_ID request with an identifier that matches stub driver 220. This will cause the plug-and-play manager to load stub driver 220 rather than the actual driver (and its FDO) in the device's stack. Device stacks 310 and 320 therefore represent scenarios where filter device object 350b has determined that the USB device that USB device PDO 311 represents should not be redirected while the USB device that USB device PDO 321 represents should be redirected.

This technique can be employed to redirect both simple USB devices and entire composite USB devices (i.e., USB device PDO 321 could represent a simple USB device or a composite USB device). It is also possible to redirect individual interfaces of a composite device using a technique known as interface level redirection (ILR). To accomplish this, filter device object 350a will allow USB composite device FDO 332 (e.g., USBCCGP.sys) to be loaded and a filter device object 350a1 can be attached to USB composite device FDO 332 as represented in device stack 330. Filter device object 350a1 can function similar to the filter device object 350a to selectively redirect the individual interfaces of the composite device.

A problem arises, however, when support for external (or virtual) USB hubs is desired. In particular, the above-described technique creates an incompatibility. If filter device object 350b is attached to the external USB hub's PDO (e.g., similar to what is shown in device stacks 310 and 320), redirection of the USB hub will not be possible. However, if this approach of attaching filter device object 350b to the PDO is eliminated, the redirection of composite devices without ILR will no longer be possible. Accordingly, there currently is no way to support redirection of simple devices, redirection of composite devices with or without ILR and redirection of external USB hubs. Simply put, existing solutions for performing ILR are mutually exclusive from existing solutions for redirecting external USB hubs.

BRIEF SUMMARY

The present invention extends to methods, systems, and computer program products for supporting redirection of USB devices in nested hub environments. A redirection driver can detect when a USB device has been connected to the internal USB hub of a client terminal. Based on the type of the USB device, the redirection driver can selectively attach a filter device object to a physical device object for the USB device. Additionally, when a functional device object is loaded, the redirection driver can selectively attach a filter device object to the functional device object based on whether the functional device object represents a USB device that is registered as a USB hub. This selective loading of filter device objects ensures that a USB device connected to an external USB hub can be redirected while also maintaining the ability to redirect USB composite devices with and without interface level redirection.

In one embodiment, the present invention is implemented by a redirection driver on a client terminal that has a nested hub environment as a method for enabling redirection of USB devices. The redirection driver determines that a USB device has been connected to an internal USB hub and identifies a type of the USB device. Based on the type of the USB device, the redirection driver determines whether to attach a filter device object to a physical device object for the USB device. When the USB device is a second USB hub that is connected to the internal USB hub, the redirection driver does not attach the filter device object to the physical device object for the USB device. In contrast, when the USB device is a simple USB device, the redirection driver attaches the filter device object to the physical device object for the USB device.

In another embodiment, the present invention is implemented as computer storage media storing computer executable instructions which when executed on a client terminal that has a nested hub environment implement a method for enabling redirection of USB devices. This method includes determining, by a redirection driver, that a USB device has been connected to an internal USB hub, and identifying, by the redirection driver, a type of the USB device. The method also includes selectively attaching a filter device object to a physical device object for the USB device based on the type of the USB device. When the USB device is identified as a second USB hub that is attached to the internal USB hub or when the USB device is identified as a USB composite device for which interface level redirection is enabled, the redirection driver does not attach the filter device object to the physical device object for the USB device. In contrast, when the USB device is identified as a simple USB device or when the USB device is identified as a USB composite device for which interface level redirection is not enabled, the redirection driver attaches the filter device object to the physical device object for the USB device.

In another embodiment, the present invention is implemented by a redirection driver on a client terminal that has a nested hub environment as a method for enabling redirection of USB devices. The redirection driver attaches an instance of a filter device object to a functional device object for an internal USB hub. The redirection driver employs the instance of the filter device object that is attached to the functional device object for the internal USB hub to detect when a USB device has been connected to the internal USB hub. When it is determined that the USB device is a second USB hub or that the USB device is a USB composite device for which interface level redirection is enabled, the redirection driver foregoes attaching an instance of the filter device object to a physical device object for the USB device. In contrast, when it is not determined that the USB device is a second USB hub or that the USB device is a USB composite device for which interface level redirection is enabled, the redirection driver attaches an instance of the filter device object to the physical device object for the USB device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "nested hub environment" should be construed as a client-side architecture in which one USB hub (e.g., an external USB hub or a virtual internal USB hub) is connected to another USB hub (e.g., the physical internal USB hub). A "redirection driver" should be construed as including filter device objects that attach to physical device objects (PFiDOs) and filter device objects that attach to functional device objects (FiDOs). Therefore, when functionality is described as being performed by a filter device object, it may also be construed as being performed by the redirection driver and vice versa. The term "simple USB device" should be construed as a USB device that is not a composite device (i.e., a USB device with a single interface).

The present invention is generally directed to scenarios where client 102 has a nested hub environment. In these scenarios, the present invention enables four general types of redirection: (1) the redirection of simple USB devices that are connected to the internal USB hub, (2) the redirection of entire USB composite devices (i.e., without ILR) that are connected to the internal USB hub; (3) the redirection of individual interfaces of USB composite devices (i.e., with ILR) that are connected to the internal USB hub; and (4) the redirection of USB devices (both simple and composite) that are connected to the external USB hub.

Figure 1:
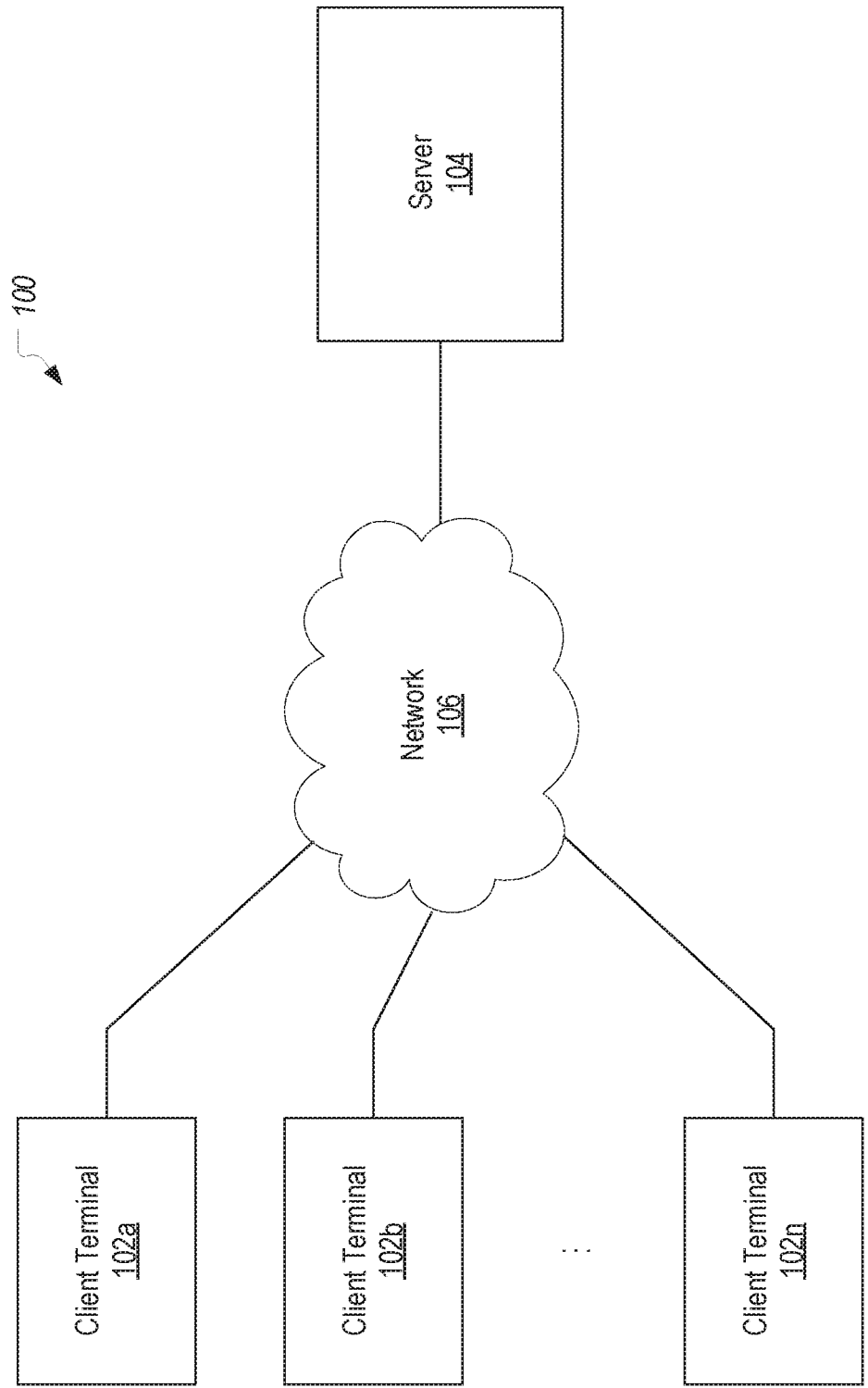
FIG. 1 illustrates an example computing environment in which the present invention can be implemented.
Figure 2:
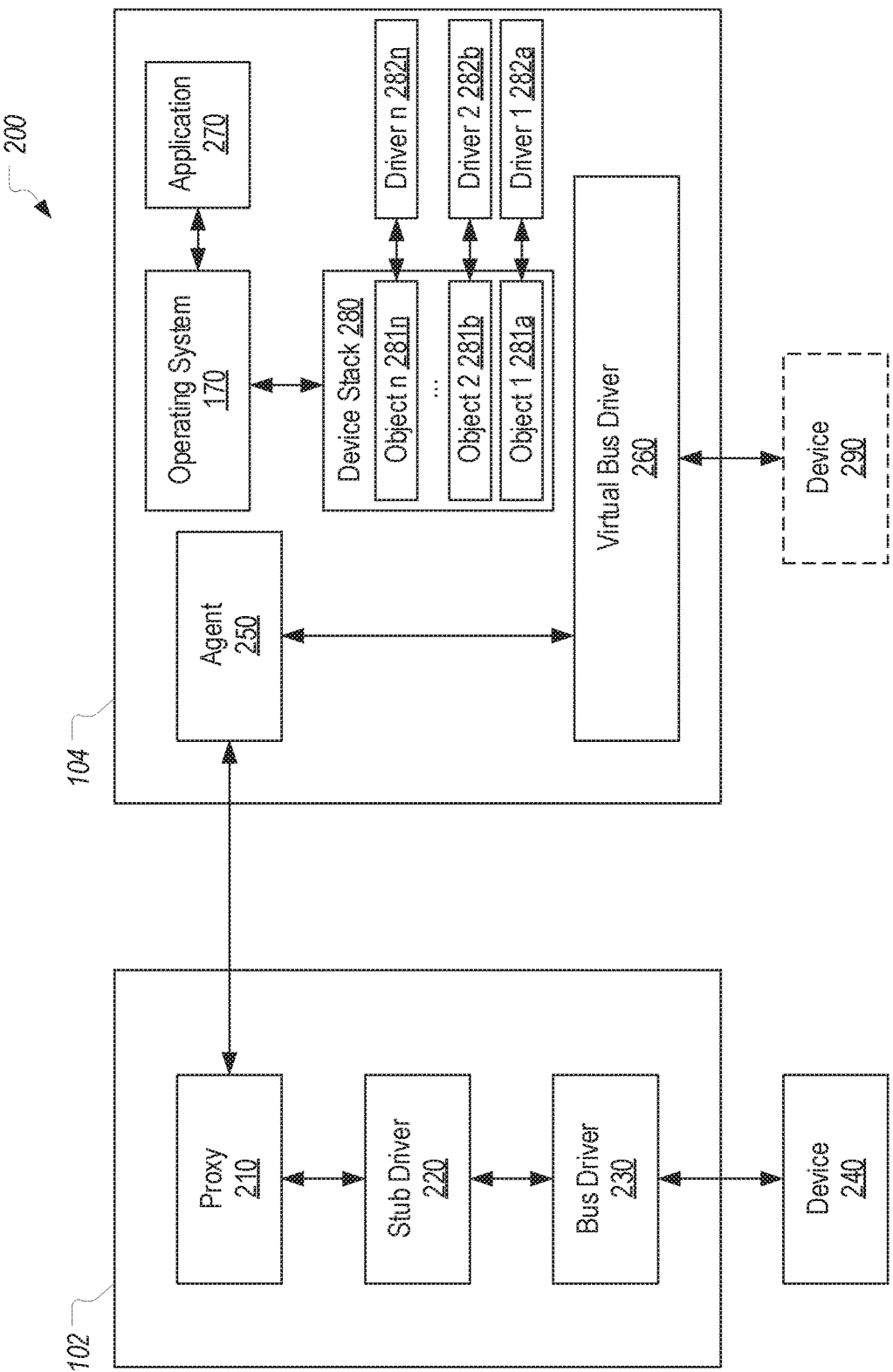
FIG. 2 illustrates a general architecture that may exist when a USB device is redirected from a client terminal to a server.
Figure 3:
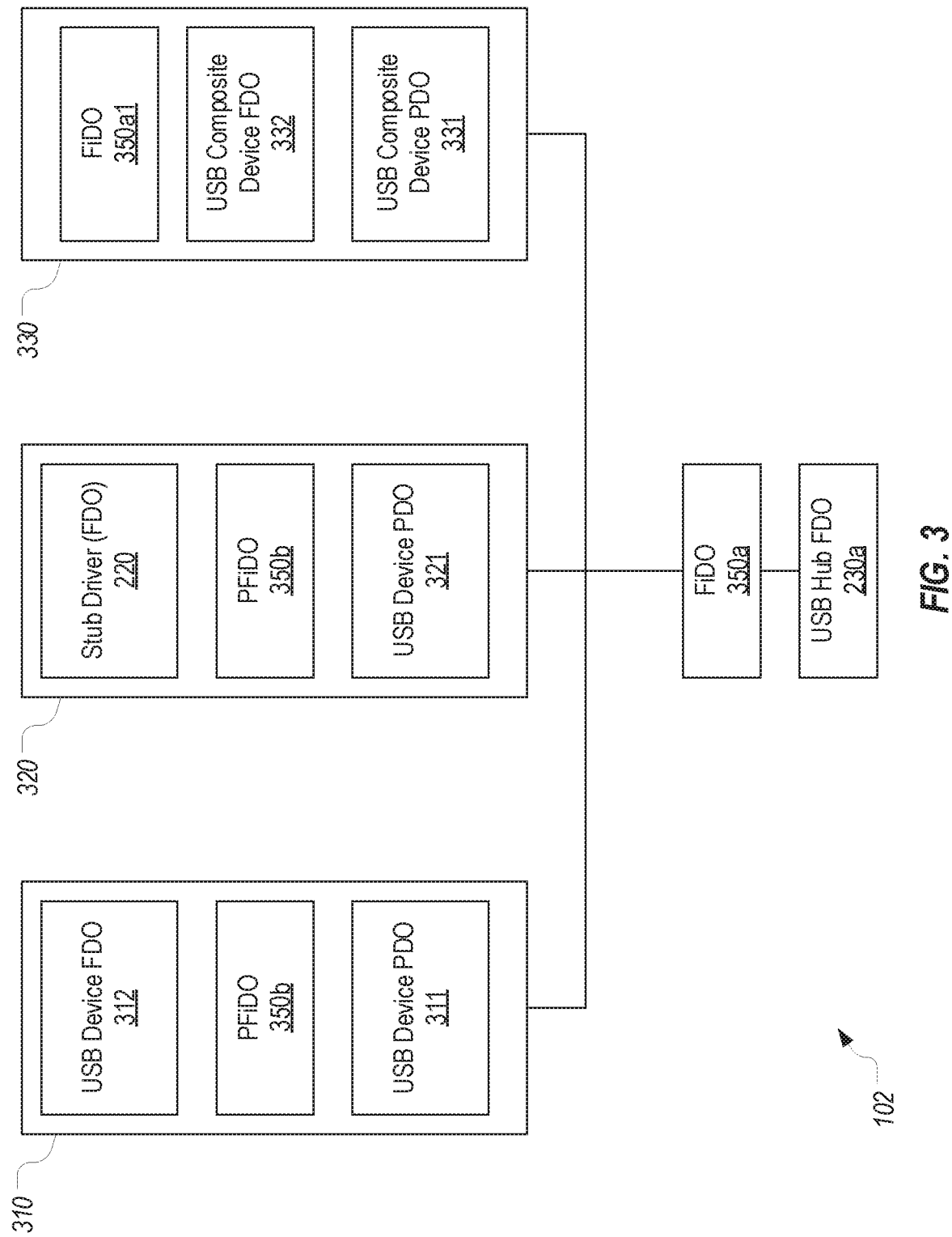
FIG. 3 illustrates an example of components that can be employed on a client terminal to enable redirection.
Figure 4:
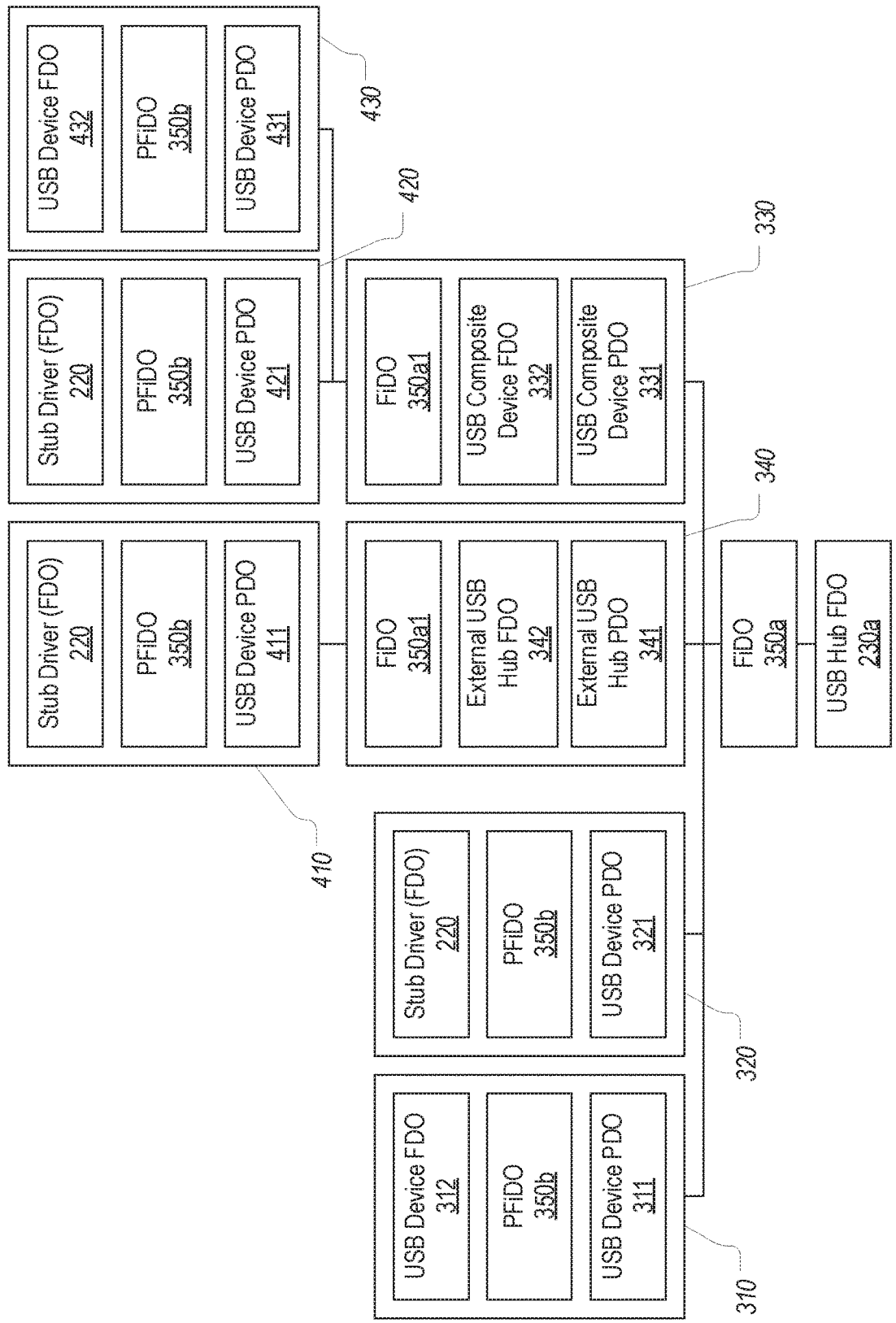
FIG. 4 illustrates an example of components that can be employed on a client terminal in accordance with embodiments of the present invention to enable redirection of simple USB devices, composite USB devices and USB devices that are connected to an external USB hub.

FIG. 4 illustrates how device stacks can be configured on client 102 to enable the four types of redirection referenced above. FIG. 4 includes device stacks 310, 320 and 330 which can be similar to what is shown in FIG. 3 and also includes device stack 340 which corresponds with an external USB hub. Device stack 340 includes external USB hub PDO 341, external USB hub FDO 342 and a filter device object 350a1 that attaches to external USB hub FDO 342. FIG. 4 also includes device stack 410 which represents the USB device connected to the external USB hub. Device stack 410 includes USB device PDO 411, filter device object 350b and stub driver 220 which indicates that this USB device is being redirected. FIG. 4 further includes devices stacks 420 and 430 which represent different interfaces of a USB composite device. Device stack 420 includes USB device PDO 421, filter device object 350b and stub driver 220 which indicates that this interface is being redirected. Device stack 430 includes USB device PDO 431, filter device object 350b and USB device FDO 432 which indicates that this interface is not being redirected.

To enable the creation of the device stacks shown in FIG. 4 and therefore to enable the four types of redirection referenced above, the present invention provides a technique for intelligently determining whether to attach a filter device object to a device object. FIGS. 5-8 and the following discussion describe this technique.

Figure 5:
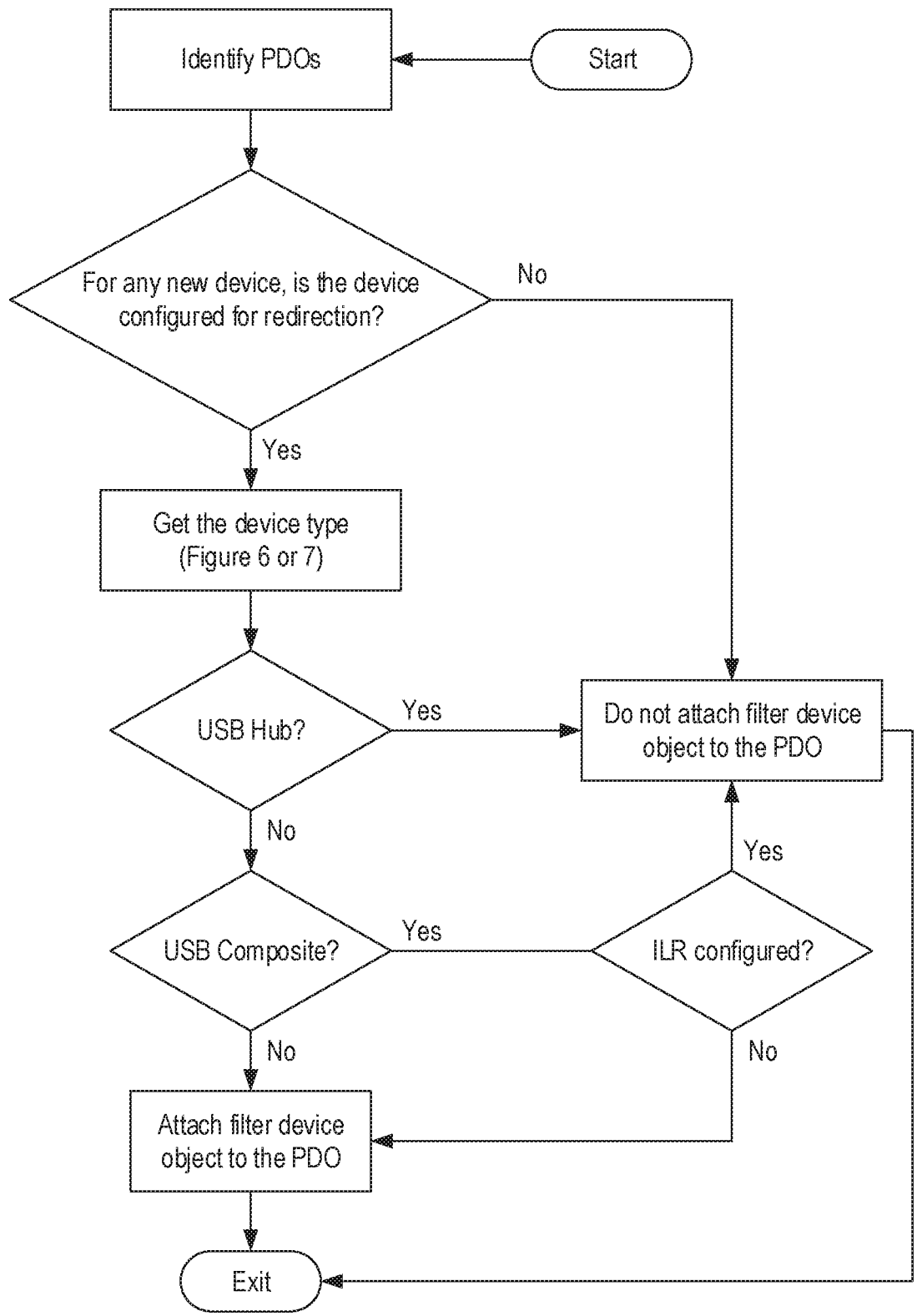
FIG. 5 provides a flow diagram representing a process by which a redirection driver selectively attaches a filter device object to a physical device object for a USB device.
Figure 6:
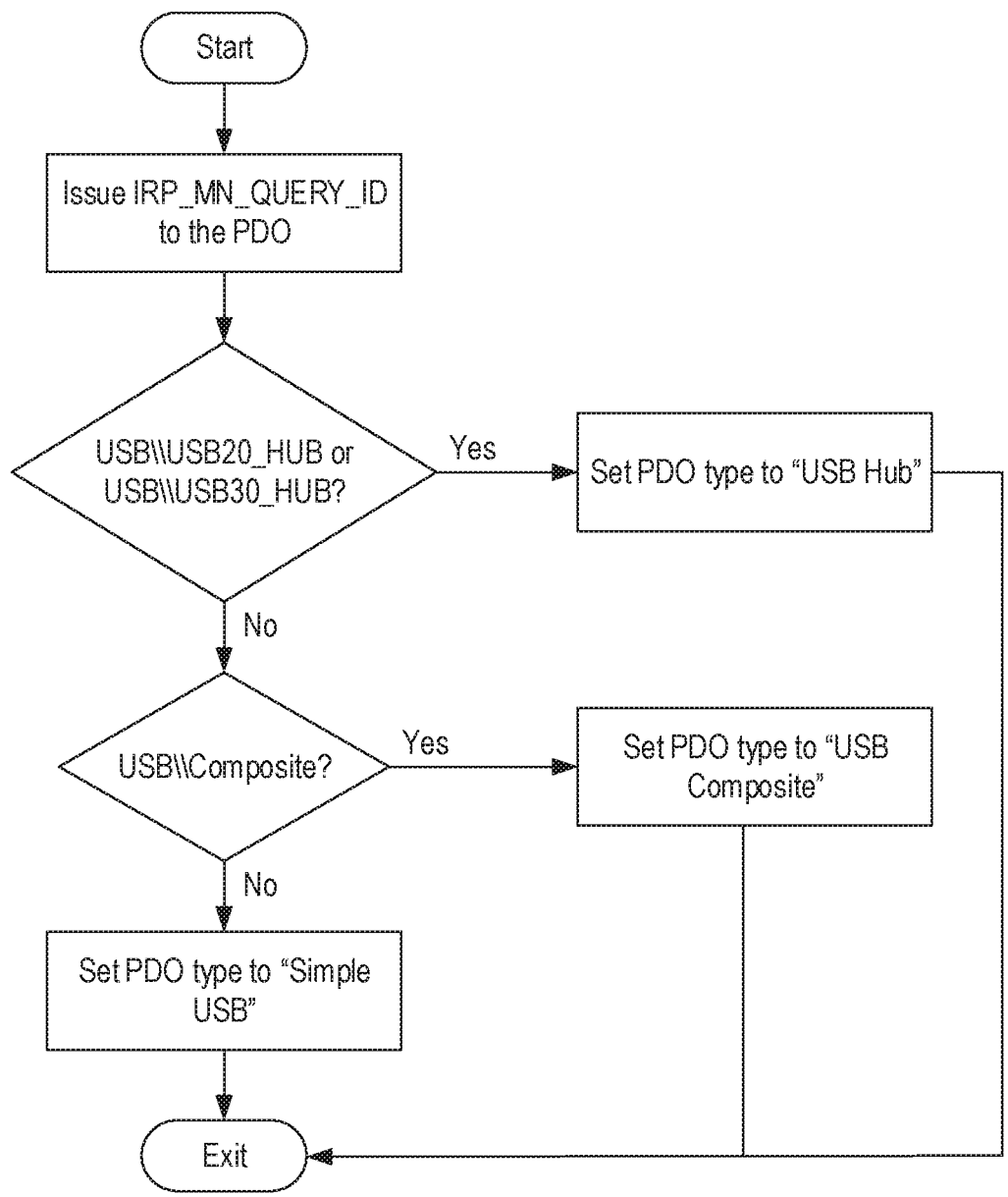
FIGS. 6 and 7 each provide a flow diagram representing a process by which a redirection driver can determine a type of a USB device.
Figure 7:
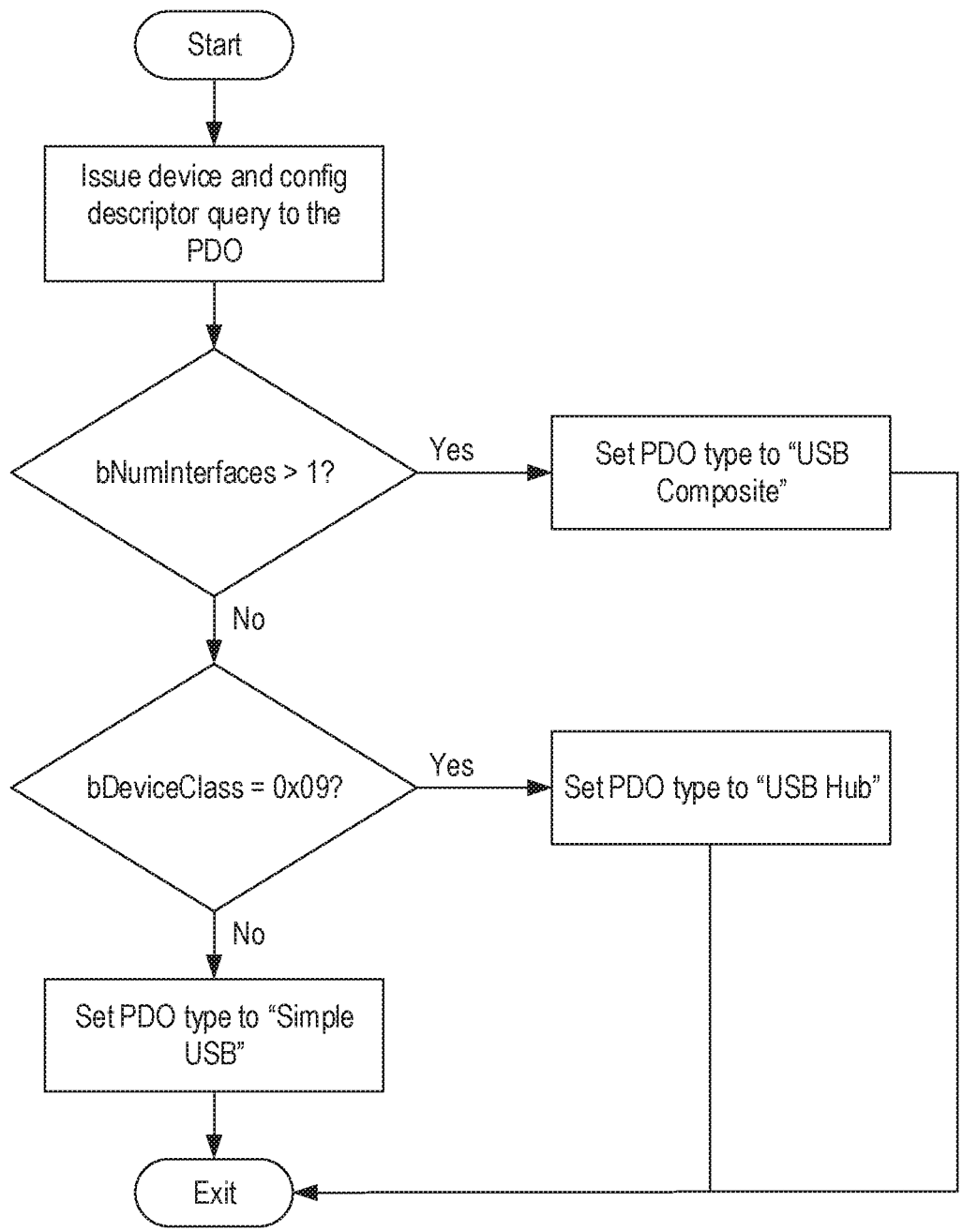

FIGS. 5-7 represent functionality that filter device object 350*a* can perform to selectively determine whether to attach filter device object 350*b* to a PDO. As generally described in the background, the redirection driver can attach filter device object 350*a* to USB hub FDO 230*a* (which would be the FDO for the internal USB hub on client 102) to enable it to monitor for IRPs targeting USB hub FDO 230*a* and to register a completion routine when an IRP_MN_QUERY_DEVICE_RELATIONS request of type BusRelations is detected. The flow diagram in FIG. 5 represents the functionality that filter device object 350*a* can perform within the completion routine to identify any new devices that are connected to the internal USB hub and to determine whether to attach a filter device object 350*b* to the PDO for any of these new devices.

The flow diagram commences with filter device object 350*a* identifying PDOs that USB hub FDO 230*a* has reported. For example, filter device object 350*a* can access the DEVICE_RELATIONS structure which USB hub FDO 230*a* will have populated with a pointer to the PDO of any device that is connected to the internal USB hub. Next, filter device object 350*a* can identify any device that is newly connected to the internal USB hub and determine whether the device is configured for redirection. For example, if the DEVICE_RELATIONS structure identifies a PDO for a newly-connected device, filter device object 350*a* can access configuration settings to determine whether the device can be redirected. It is noted that the determination of whether a device is configured for redirection may be different from the determination of whether a device should be redirected as opposed to being kept local.

If a device is not configured for redirection, filter device object 350*a* will forego attaching filter device object 350*b* to the PDO. In contrast, if the device is configured for redirection, filter device object 350*a* can determine the device type in accordance with one of the processes shown in FIG. 6 or 7. Once the device type is known, filter device object 350*a* can determine whether the device is a USB hub. If so, filter device object 350*a* will forego attaching filter device object 350*b* to the PDO. If not, filter device object 350*a* can determine whether the device is a USB composite device. If so, filter device object 350*a* can also determine whether ILR is configured. If so, filter device object 350*a* will forego attaching filter device object 350*b* to the PDO. In contrast, if the device is not a USB composite device or if the device is a USB composite device but ILR is not configured, filter device object 350*a* can attach filter device object 350*b* to the PDO for that device. To summarize, filter device object 350*a* will attach filter device object 350*b* to a device's PDO only if: (1) the device is configured for redirection; (2) the device is not a USB hub; and (3) if the device is a USB composite device, ILR is not configured. With reference to FIG. 4, filter device object 350*b* will therefore be attached to the PDO of a simple USB device and to the PDO of a USB composite device when ILR is not implemented.

FIG. 6 provides a flow diagram for a Windows-specific process for identifying the device type for a PDO. When filter device object 350*a* determines that a new device has been connected to the internal USB hub (i.e., that USB hub FDO 230*a* has created a new PDO), it can issue an IRP_MN_QUERY_ID request to the PDO for the device. This IRP_MN_QUERY_ID request can specify BusQueryCompatibleIDs to cause the PDO to return its compatible IDs.

Once it receives a response to the IRP_MN_QUERY_ID request, filter device object 350*a* can determine whether the response includes a compatible ID of USB\\USB20_HUB or USB\\USB30_HUB. If so, it can set the PDO (or device) type to USB hub. If not, filter device object 350*a* can determine whether the response includes a compatible ID of USB\\Composite. If so, it can set the PDO type to USB composite. If not, filter device object 350*a* can set the PDO type to the default value of simple USB.

FIG. 7 provides a flow diagram for an OS-independent process for identifying the device type for a PDO. When filter device object 350*a* determines that a new device has been connected to the internal USB hub, it can issue device and configuration descriptor requests to the PDO. For example, filter device object 350*a* can use the UsbBuildGetDescriptorRequest( ), the IoBuildDeviceIoControlRequest( ) and the IoCallDriver( ) functions. Once it receives the device and configuration descriptors from the PDO, filter device object 350*a* can determine whether the bNumInterfaces member of the configuration descriptor is greater than 1. If so, filter device object 350*a* can set the PDO type to USB composite. If not, filter device object 350*a* can determine whether the bDeviceClass member of the device descriptor is set to 0×09. If so, filter device object 350*a* can set the PDO type to USB hub. If not, filter device object 350*a* can set the PDO type to the default value of simple USB.

Figure 8:
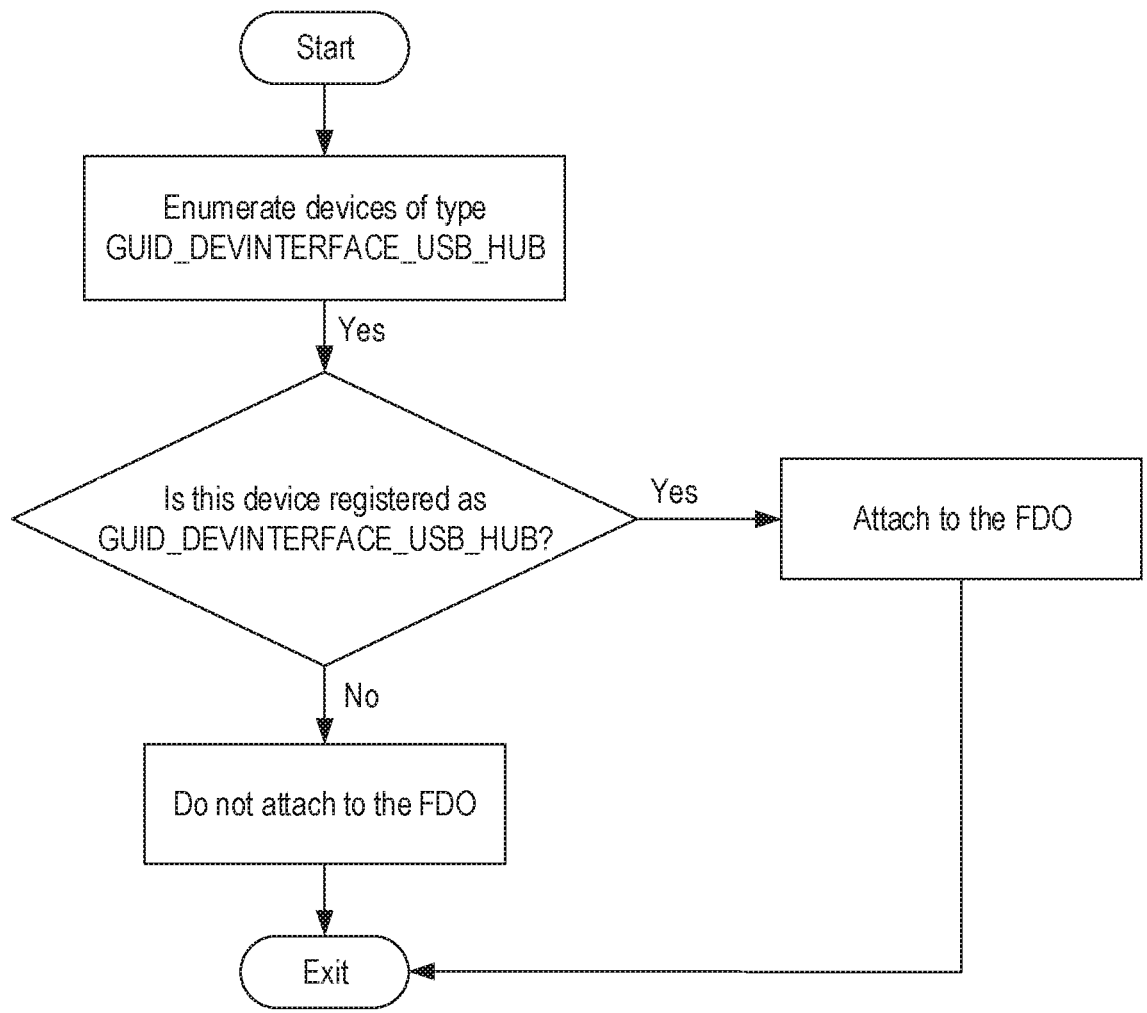
FIG. 8 provides a flow diagram representing a process by which a redirection driver selectively attaches a filter device object to a functional device object for a USB device.

FIG. 8 represents functionality that the redirection driver can perform to selectively determine whether to attach a filter device object 350*a*1 to a FDO. The redirection driver can be registered as a USB class upper filter driver so that its AddDevice routine will be called whenever a function driver is loaded (i.e., whenever an FDO is created). Within its AddDevice routine, the redirection driver can perform the process represented in the flow diagram of FIG. 8 to determine whether filter device object 350*a*1 should be attached to the FDO.

The redirection driver can first enumerate devices of type GUID_DEVINTERFACE_USB_HUB. For example, the redirection driver could call the IoGetDeviceInterfaces function and specify GUID_DEVINTERFACE_USB_HUB as the device interface class to enumerate. This function will return a list of zero or more symbolic link names that identify each device interface instance that matches the GUID_DEVINTERFACE_USB_HUB device interface class. In some embodiments, this call to the IoGetDeviceInterfaces function can specify the PDO of the current device so that the results will be limited to matching device interface instances for the current device. Next, the redirection driver can determine whether the current device (i.e., the device for which the FDO was created) is registered as a GUID_DEVINTERFACE_USB_HUB device interface class. In cases where the call to the IoGetDeviceInterfaces function is limited to the PDO of the current device, the redirection driver can determine that the current device is registered as a GUID_DEVINTERFACE_USB_HUB device interface class if the call returns at least one symbolic link name. In cases where the call to the IoGetDeviceInterfaces function is not limited to the PDO of the current device, the redirection driver can determine that the current device is registered as a GUID_DEVINTERFACE_USB_HUB device interface class if the list includes a symbolic link name pertaining to the PDO of the current device. If the current device is registered as a GUID_DEVINTERFACE_USB_HUB device interface class, the redirection driver can attach filter device object 350a1 to the FDO. Otherwise, the redirection driver will not attach filter device object 350a1 to the FDO.

With reference to FIG. 4, this functionality performed in the AddDevice routine for the USB class upper filter driver will cause filter device object 350a1 to be attached to the FDO in device stacks 330 and 340 but not to the FDO in device stacks 310 and 320. In particular, the driver for an external USB hub (which provides external USB hub FDO 342) as well as the driver for a USB composite device (which provides external USB composite device FDO 332 (e.g., USBCCGP.sys)) will register themselves as USB hubs. Accordingly, when an external USB hub is connected, filter device object 350a1 will be attached to external USB hub FDO 342 and can perform functionality similar to filter device object 350a. This functionality includes loading filter device object 350b in device stack 410 which in turn allows stub driver 220 to be loaded in device stack 410 with the end result being that a USB device connected to the external USB hub can be redirected. Likewise, when a USB composite device is connected to the internal USB hub, filter device object 350a1 will be attached to USB composite device FDO 332 and can perform functionality similar to filter device object 350a. This functionality includes loading filter device object 350b in device stacks 420 and 430 which in turn allows stub driver 220 to be loaded in device stack 420 to redirect one interface and USB device FDO 432 to be loaded in device stack 430 to keep another interface local (i.e., ILR can be provided in conjunction with redirecting USB devices connected to an external USB hub). Furthermore, with this technique, filter device object 350b will still be attached to the USB device PDO for a USB composite device that is connected to the internal USB hub when ILR is not enabled thereby allowing the entire USB composite device to be redirected. In short, the technique allows all four types of redirection to be performed on a client with a nested hub environment.

Figure 9:
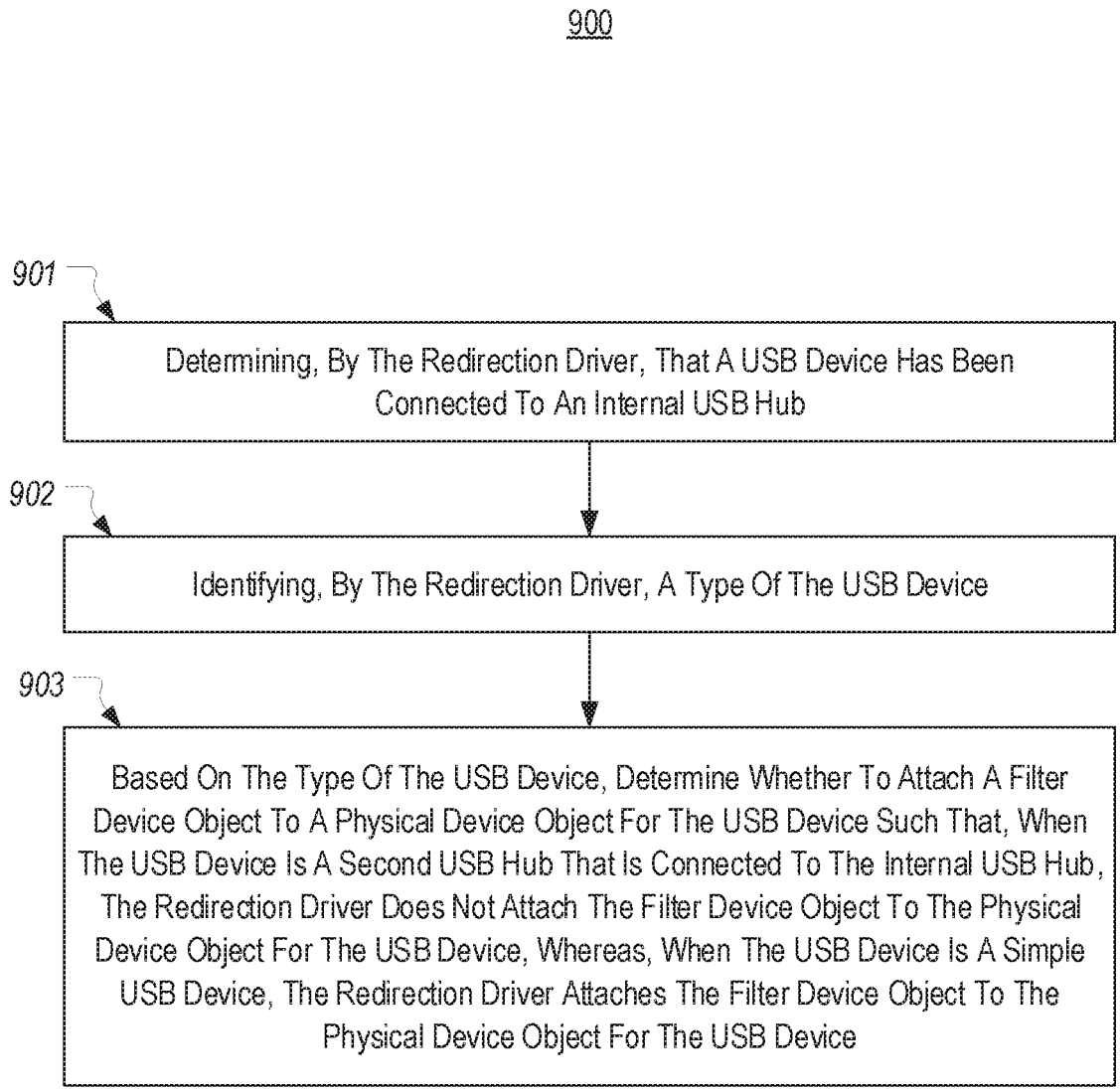
FIG. 9 provides a flowchart of an example method for enabling redirection of USB devices on a client terminal that has a nested hub environment.

FIG. 9 provides a flowchart of an example method 900 for enabling redirection of USB devices. Method 900 can be implemented by a redirection driver that executes on a client terminal that has a nested hub environment.

Method 900 includes an act 901 of determining that a USB device has been connected to an internal USB hub. For example, filter device object 350a can be attached to USB hub FDO 230a to enable the redirection driver to handle IRP_MN_QUERY_DEVICE_RELATIONS requests that target USB hub FDO 230a.

Method 900 includes an act 902 of identifying a type of the USB device. For example, the redirection driver can send one or more requests to a physical device object of a newly connected USB device to obtain compatible IDs, a device descriptor and/or a configuration descriptor of the USB device.

Method 900 includes an act 903 of, based on the type of the USB device, determining whether to attach a filter device object to a physical device object for the USB device such that, when the USB device is a second USB hub that is connected to the internal USB hub, the redirection driver does not attach the filter device object to the physical device object for the USB device, whereas, when the USB device is a simple USB device, the redirection driver attaches the filter device object to the physical device object for the USB device. For example, the redirection driver can attach filter device object 350b to USB device PDO 311 or 321 upon determining that the PDOs represent a simple USB device, but can forego attaching filter device object 350b to external USB hub PDO 341 upon determining that the PDO represents an external USB hub.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a redirection driver on a client terminal that has a nested hub environment, for enabling redirection of USB devices, the method comprising:

determining, by the redirection driver, that a USB device has been connected to an internal USB hub;

identifying, by the redirection driver, a type of the USB device;

based on the type of the USB device, determining whether to attach a filter device object to a physical device object for the USB device such that, when the USB device is a second USB hub that is connected to the internal USB hub, the redirection driver does not attach the filter device object to the physical device object for the USB device, whereas, when the USB device is a simple USB device, the redirection driver attaches the filter device object to the physical device object for the USB device.

2. The method of claim 1, wherein determining whether to attach the filter device object to the physical device object for the USB device includes determining whether the USB device is a USB composite device and, if so, whether interface level redirection is enabled for the USB composite device such that when the USB device is a USB composite device and interface level redirection is enabled, the redirection driver does not attach the filter device object to the physical device object for the USB device, whereas, when the USB device is a USB composite device and interface level redirection is not enabled, the redirection driver attaches the filter device object to the physical device object for the USB device.

3. The method of claim 1, wherein the second USB hub is an external USB hub.

4. The method of claim 1, wherein the second USB hub is a virtual internal USB hub.

5. The method of claim 1, wherein identifying the type of the USB device comprises:
sending, by the redirection driver and to the physical device object for the USB device, a request for one or more identifiers of the USB device.

6. The method of claim 5, wherein the one or more identifiers of the USB device comprise one or more compatible identifiers.

7. The method of claim 5, wherein the request for one or more identifiers of the USB device comprises an IRP_MN_QUERY_ID request.

8. The method of claim 1, wherein identifying the type of the USB device comprises:
sending, by the redirection driver and to the physical device object for the USB device, one or more requests for a device descriptor and a configuration descriptor of the USB device;
when the configuration descriptor indicates that the USB device has more than one interface, determining that the USB device is a USB composite device; and
when the device descriptor indicates that the USB device's device class equals 0x09, determining that the USB device is a USB hub.

9. The method of claim 1, further comprising:
in response to a functional device object for the USB device being loaded, determining whether the USB device is registered as a USB hub device such that, when the USB device is registered as a USB hub device, the redirection driver attaches a filter device object to the functional device object for the USB device, whereas, when the USB device is not registered as a USB hub device, the redirection driver does not attach the filter device object to the functional device object for the USB device.

10. The method of claim 9, wherein determining whether the USB device is registered as a USB hub device comprises determining whether the USB device has a device interface class of GUID_DEVINTERFACE_USB_HUB.

11. The method of claim 1, wherein determining that a USB device has been connected to an internal USB hub comprises accessing, within a completion routine for a request that targets a functional device object for the internal USB hub, a structure that identifies a physical device object for any USB device that is connected to the internal USB hub.

12. One or more computer storage media storing computer executable instructions which when executed on a client terminal that has a nested hub environment implement a method for enabling redirection of USB devices, the method comprising:
determining, by a redirection driver, that a USB device has been connected to an internal USB hub;
identifying, by the redirection driver, a type of the USB device; and
selectively attaching a filter device object to a physical device object for the USB device based on the type of the USB device wherein:
when the USB device is identified as a second USB hub that is attached to the internal USB hub or when the USB device is identified as a USB composite device for which interface level redirection is enabled, the redirection driver does not attach the filter device object to the physical device object for the USB device; whereas
when the USB device is identified as a simple USB device or when the USB device is identified as a USB composite device for which interface level redirection is not enabled, the redirection driver attaches the filter device object to the physical device object for the USB device.

13. The computer storage media of claim 12, wherein the second USB hub is an external USB hub or a virtual internal USB hub.

14. The computer storage media of claim 12, wherein identifying the type of the USB device comprises one or more of:
retrieving one or more compatible identifiers of the USB device;
retrieving a device descriptor of the USB device; or
retrieving a configuration descriptor of the USB device.

15. The computer storage media of claim 12, wherein the method further comprises:
in response to a functional device object for the USB device being loaded, determining whether the USB device is registered as a USB hub device such that, when the USB device is registered as a USB hub device, the redirection driver attaches a filter device object to the functional device object for the USB device, whereas, when the USB device is not registered as a USB hub device, the redirection driver does not attach the filter device object to the functional device object for the USB device.

16. The computer storage media of claim 15, wherein the method further comprises:
when the filter device object is attached to the functional device object for the USB device, attaching another filter device object to another physical device object that represents either a second USB device that is connected to the second USB hub or an interface of the USB composite device.

17. A method, implemented by a redirection driver on a client terminal that has a nested hub environment, for enabling redirection of USB devices, the method comprising:
attaching an instance of a filter device object to a functional device object for an internal USB hub;

employing the instance of the filter device object that is attached to the functional device object for the internal USB hub to detect when a USB device has been connected to the internal USB hub;

when it is determined that the USB device is a second USB hub or that the USB device is a USB composite device for which interface level redirection is enabled, foregoing attaching an instance of the filter device object to a physical device object for the USB device; and when it is not determined that the USB device is a second USB hub or that the USB device is a USB composite device for which interface level redirection is enabled, attaching an instance of the filter device object to the physical device object for the USB device.

18. The method of claim 17, further comprising:

detecting that a functional device object for the USB device has been loaded;

when it is determined that the USB device is registered as a USB hub device, attaching an instance of the filter device object to the functional device object for the USB device; and when it is determined that the USB device is not registered as a USB hub device, foregoing attaching an instance of the filter device object to the functional device object for the USB device.

19. The method of claim 17, wherein the second USB hub is an external USB hub.

20. The method of claim 17, wherein determined whether the USB device is a second USB hub or whether the USB device is a USB composite device comprises retrieving one or more of:

one or more compatible identifiers of the USB device;

a device descriptor of the USB device; or a configuration descriptor of the USB device.

* * * * *